(12) United States Patent
Fan (10) Patent No.: US 10,791,056 B2
(45) Date of Patent: Sep. 29, 2020

(54) POLICY BASED SERVICE ROUTING

(71) Applicant: Citrix Systems, Inc., Fort Lauderdale, FL (US)

(72) Inventor: Tian Fan, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 15/953,590

(22) Filed: Apr. 16, 2018

(65) Prior Publication Data

US 2019/0319885 A1    Oct. 17, 2019

(51) Int. Cl.
| | |
|---|---|
| *H04L 12/813* | (2013.01) |
| *H04L 29/08* | (2006.01) |
| *H04L 12/741* | (2013.01) |
| *G06F 16/951* | (2019.01) |

(52) U.S. Cl.
CPC .......... *H04L 47/20* (2013.01); *G06F 16/951* (2019.01); *H04L 45/74* (2013.01); *H04L 67/322* (2013.01)

(58) Field of Classification Search
None
See application file for complete search history.

(56) References Cited

U.S. PATENT DOCUMENTS

| | | | |
|---|---|---|---|
| 7,315,541 B1 * | 1/2008 | Housel | H04L 29/12481 370/392 |
| 9,629,060 B2 * | 4/2017 | Arora | H04W 40/04 |
| 2007/0147347 A1 * | 6/2007 | Ristock | H04L 67/16 370/352 |
| 2010/0299437 A1 | 11/2010 | Moore | |
| 2013/0019282 A1 | 1/2013 | Rice et al. | |
| 2014/0259093 A1 * | 9/2014 | Narayanaswamy | H04L 67/20 726/1 |
| 2015/0365328 A1 * | 12/2015 | Luke | H04L 47/125 370/238 |
| 2016/0219420 A1 * | 7/2016 | Sah | H04W 4/14 |
| 2016/0352588 A1 | 12/2016 | Subbarayan et al. | |
| 2017/0012955 A1 * | 1/2017 | Petrack | H04L 63/08 |
| 2017/0026461 A1 * | 1/2017 | Boutros | H04L 67/101 |
| 2018/0317121 A1 * | 11/2018 | Liao | H04W 28/0268 |

* cited by examiner

*Primary Examiner* — Gregory B Sefcheck
*Assistant Examiner* — Srinivasa R Reddivalam
(74) *Attorney, Agent, or Firm* — Allen, Dyer, Doppelt + Gilchrist, PA (57) ABSTRACT

A microservice architecture includes service instances collectively configured to cooperate with one another to provide a service, and a service router associated with the service instances and configured to receive a service request from a computing device. The service request includes a service request address. The service router includes a routing policy database with routing policies, with each routing policy including a routing policy address and a routing action. The service router queries the routing policy database with the service request address to find a routing policy having a routing policy address matching the service request address, and executes the routing action specified by the matched routing policy to complete routing of the service.

19 Claims, 6 Drawing Sheets

| Routing policies: | | | | |
|---|---|---|---|---|
| Policy ID | Priority | Service ID | SR URI | Rule |
| <001> | 1 | Service B | /b/** | { <br>    "filter": "default", <br>    "action": { <br>       "dst_uri": "b-prod.com" <br>    } <br> } |
| <002> | 100 | Service B | /b/** | { <br>    "filter": { <br>       "type": "context", <br>       "rule": "costomer eq 'cus1' and geo eq 'US'" <br>    }, <br>    "action": { <br>       "dst_uri": "b-devl.com" <br>    } <br> } |

POLICY BASED SERVICE ROUTING

TECHNICAL FIELD

The present disclosure relates to service routing, and more particularly, to policy based service routing within a microservice architecture.

BACKGROUND

A microservice architecture, or simply microservices, is a distinctive method of developing software applications that has grown in popularity in recent years. The software applications provide services that may be developed as a suite of independently deployable, small, modular service instances in which each service instance runs a unique process and communicates through a well-defined, lightweight mechanism to serve a goal.

In microservices, it is common to build a layer of service routing on top of individual service instances. Instead of clients communicating directly to the service instances, communications is through a service router associated with the service instances. The service router organizes the different service instances based on operation logic. The operation logic service allows a computing device to connect to a service without the need to care about the individual service instances.

In most cases, operation of the service router is straightforward. When a service request arrives, the service router picks a service instance and forwards the service request to that service instance. The service instance may be randomly picked or may be selected based on an algorithm, such as a round-robin scheduling algorithm. This provides simplicity to client applications, but also raises a question: how to route requests between different service instances with flexibility for different business scenarios.

SUMMARY

A microservice architecture includes service instances collectively configured to cooperate with one another to provide a service, and a service router associated with the service instances and configured to receive a service request from a computing device. The service request includes a service request address. The service router may comprise a routing policy database with routing policies, with each routing policy having a routing policy address and a routing action. The service router may be configured to query the routing policy database with the service request address to find a routing policy having a routing policy address matching the service request address, and execute the routing action specified by the matched routing policy to complete routing of the service request to one of the service instances.

An advantage of applying routing policies by the service router is to provide flexibility in various routing scenarios. The routing actions of the routing policies may be used, for example, to support development testing of a specific service instance, A/B testing for customers, smart routing considering loads of the service instances, and resource usage of the service instances. Moreover, routing policies may be applied to existing microservice architectures without having to change operation logic of the microservice architectures.

The service instances may comprise servers and/or containers. The routing action of the matched routing policy may include a destination address corresponding to the service instance receiving the service request, where the destination address may be different from the service request address.

Each routing policy may have a priority associated therewith, and if more than one routing policy matches the service request address, then the service router may be further configured to execute the routing action specified by the matched routing policy having the highest priority.

Each routing policy may have a rule associated therewith, and wherein the querying by the service router may further include applying the rule to each routing policy before determining if the service request address has a matched routing policy.

The service request may include identification of a user of the computing device, and the rule may identify at least one individual, and wherein application of the rule may include determining if the identity of the user of the computing device matches the identity of the at least one individual in the rule. Similarly, the service request may include a geographic location of a user of the computing device, and wherein application of the rule may include determining if the geographic location of the user of the computing device is within the geographic area in the rule.

The service request may correspond to at least one of an HTTP request, a JSON-RPC request, and an XML-RPC request, with the respective addresses associated therewith corresponding to a URI. In yet other embodiments, the service request may correspond to a gPRC request, with the address associated therewith corresponding to an IP port pair.

Another aspect is directed to a method for operating a service router associated with a plurality of service instances collectively configured to cooperate with one another to provide a service within a microservice architecture, with the service router comprising a routing policy database with routing policies, and with each routing policy including a routing policy address and a routing action. The method comprises receiving a service request from a computing device, with the service request including a service request address; querying the routing policy database with the service request address to find a routing policy having a routing policy address matching the service request address; and executing the routing action specified by the matched routing policy to complete routing of the service request to one of the service instances.

Yet another aspect is directed to a non-transitory computer readable medium for a service router associated with a plurality of service instances collectively configured to cooperate with one another to provide a service within a microservice architecture, with the service router comprising a routing policy database with a plurality of routing policies, and with the non-transitory computer readable medium having a plurality of computer executable instructions for causing the service router to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
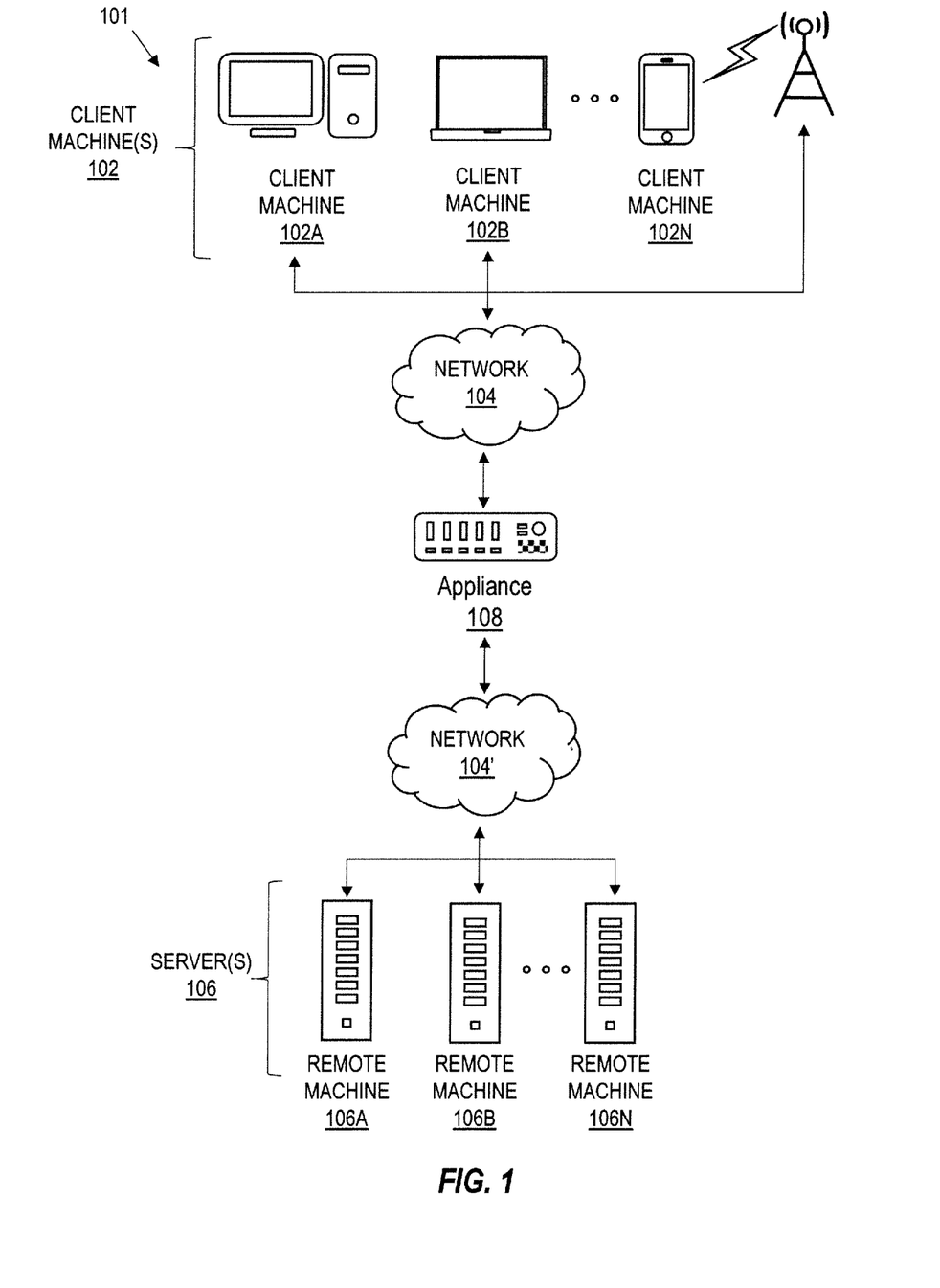
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over Internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
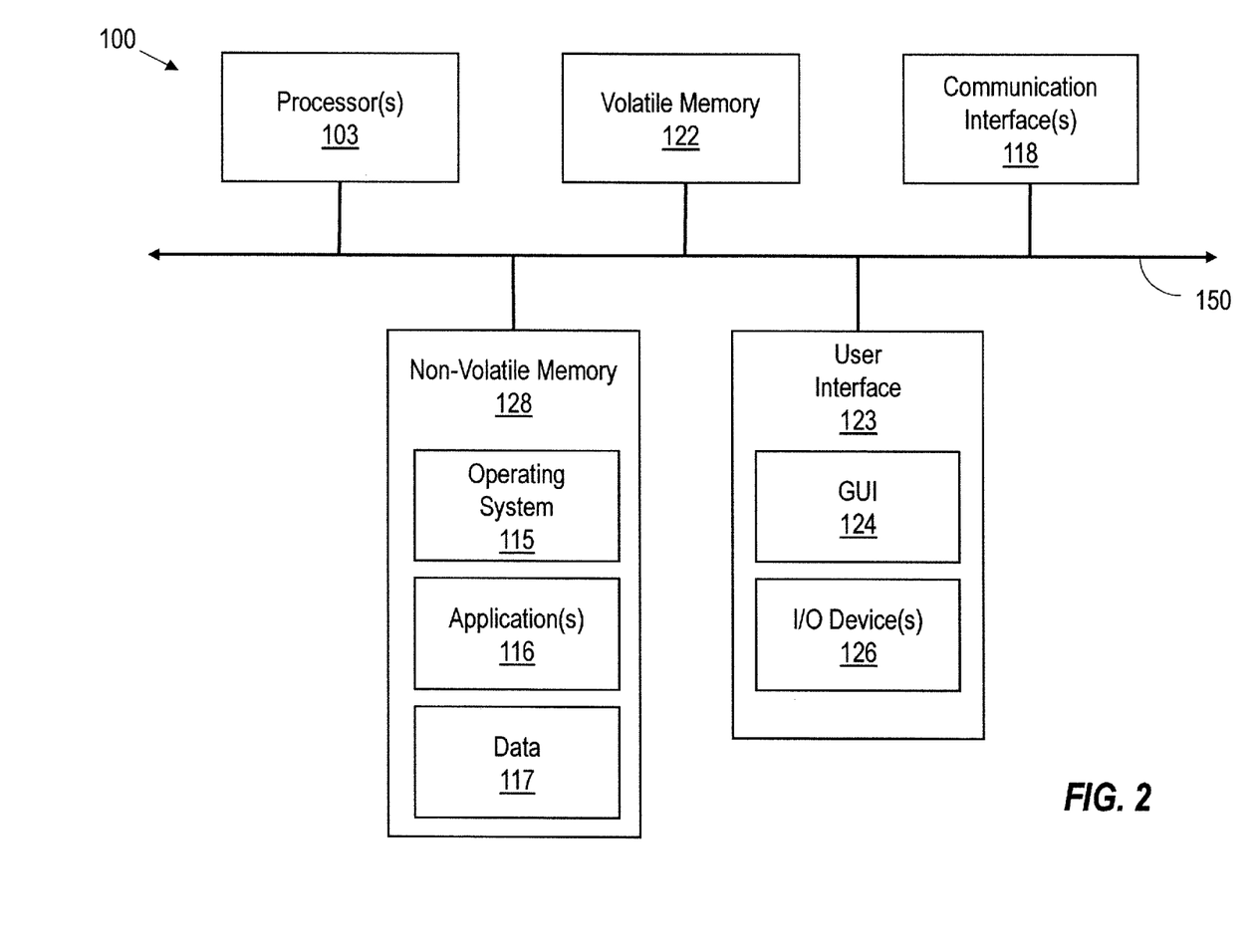
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
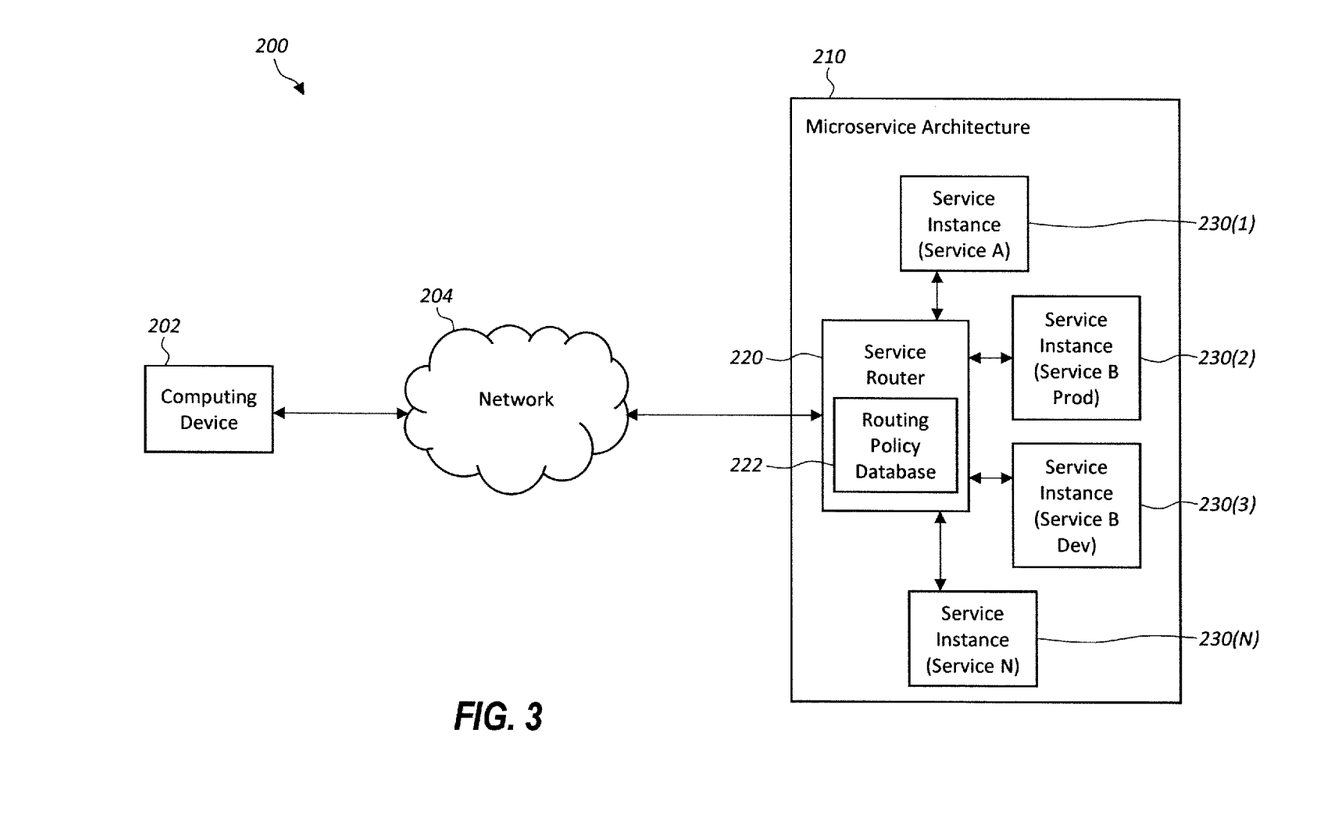
FIG. 3 is a block diagram of a microservice architecture that includes a service router with a routing policy database in which various aspects of the disclosure may be implemented.

Referring now to FIG. 3, a network environment 200 including a microservice architecture 210 with a service router 220 that includes a routing policy database 222 will be discussed. The microservice architecture 210 includes service instances 230(1)-230(n) collectively configured to cooperate with one another to provide a service. The service router 220 is associated with the service instances 230(1)-230(n), and is configured to receive a service request from a computing device 202 via a network 204. The service request includes a service request address.

The service router 220 includes a routing policy database 222 and is to apply routing policies to provide flexibility in various routing scenarios. Each routing policy has a routing policy address and a routing action. The service router is configured to query the routing policy database 222 with the service request address to find a routing policy having a routing policy address matching the service request address, and execute the routing action specified by the matched routing policy to complete routing of the service request to one of the service instances 230(1)-230(n).

The routing action of the matched routing policy includes a destination address corresponding to the service instance receiving the service request. The destination address may be different from the service request address. If the service request address does not match any of the routing policies in the routing policy database 222 as part of the querying, then an error message is returned to the user of the computing device 202.

The service instances 230(1)-230(n) may be generally referred to as a service instance 230. The service instances 230 may be configured as servers and/or containers, for example. A container, such as a Docker container, is a lightweight, stand-alone, executable package of a piece of software that includes everything needed to run it: code, runtime, system tools, system libraries, and settings.

Each service instance 230 provides a particular function or service, and each service instance 230 may interact with at least one other service instance 230. Each service instance 230 is developed, deployed and managed independent of the other service instances 230 within the microservice architecture 210.

In the illustrated microservice architecture 210, service instance 230(1) may provide Service A, service instance 230(2) may provide Service B-production, service instance 230(3) may provide Service B-development, and service instance 230(n) may provide Service N. To illustrate the need to have flexibility in routing scenarios, web developers maintaining the microservice architecture 210 want to add a new feature to Service B-production 230(2). This new feature is initially provided in Service B-development 230(3).

Service B-development 230(3) first needs to be tested with a limited group of users while at the same time Service B-production 230(2) is still in normal service to users not in the limited group of users. The limited group of users may be one or more of the web developers, for example. Routing a service request from anyone of the web developers to the Service B-development 230(3) allows the web developers to test and debug any problems with the new feature without affecting normal operation of service requests from other users to Service B-production 230(2). Example routing policies supporting this routing scenario for Service B-production 230(2) and Service B-development 230(3) are provided by a routing policy chart 250 illustrated in FIG. 4.

Figure 4:
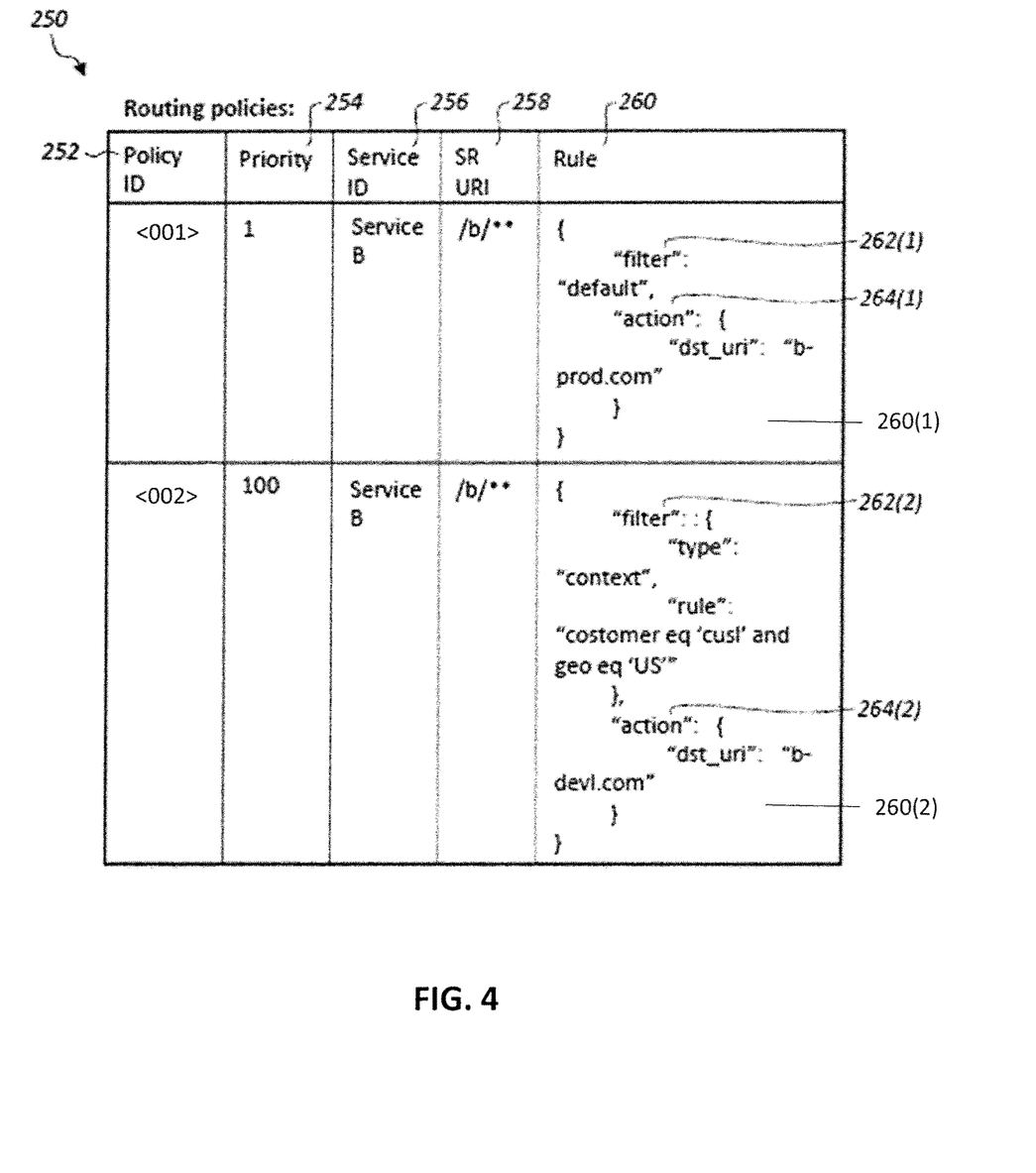
FIG. 4 is an example routing policy chart for the service router illustrated in FIG. 3 when more than one routing policies are matched.

The service request received by the service router 220 has a service request address corresponding to Service B, such as /b/**. The service router 220 queries each of the routing policies in the routing policy database 222 with the service request address to find a routing policy having a routing policy address matching the service request address. In this example, two routing policies match the service request address. In column 252 of the routing policy chart 250 are the policy IDs: routing policy <001> and routing policy <002>, both of which correspond to Service B.

In column 256 of the routing policy chart 250 are the respective Service IDs of routing policies <001> and <002>, both of which correspond to Service B. In column 258 are the routing policy addresses of routing policies <001> and <002>, both of which correspond to Service B. The respective routing policy address of each matched routing policy <001> and <002> is /b/**, as provided in column 258.

As illustrated in column 258, the service request may correspond to an HTTP request, with the address associated therewith corresponding to a URI. Similarly, the service request may correspond to a JSON-RPC request or an XML-RPC request, with the respective addresses associated therewith also corresponding to a URI. Alternatively, the service request may correspond to a gPRC request, with the address associated therewith corresponding to an IP port pair. The above service request types are examples, and are not to be limiting to other types of service requests that may be used.

The particular routing action of each routing policy <001> and <002> may be determined by the rules in column 260. Rule 260(1) is for routing policy <001> and rule 260(2) is for routing policy <002>. For there to be a matched routing policy, each rule 260(1) and 260(2) needs to be met in addition to the service request address matching the policy address of the respective routing policies <001> and <002>.

The rules are not limited to any particular format, and may vary between the routing policies. The rules may be straightforward when there are no restrictions to accessing a particular service instance, such as Service A 230(1), to placing restrictions to accessing a particular service instance, such as Service B-development 230(3).

When restrictions are to be implemented, the rules may include a filter to narrow the scope of requests to be applied to the routing policy. The filter can support multiple types, including default, content, and ip-range, for example. The rules may include an action field indicating the routing action that is to be taken for the matched routing policy.

For rule 260(1), a filter 262(1) is used to narrow the scope of requests to be applied to routing policy <001>. In this case, the filter 262(1) is listed as "default" meaning that any service request having service request address /b/ is considered to be a match to routing policy <001>. Accordingly, since the service request has service request address /b/ it is a match to routing policy <001>.

Rule 260(1) also includes an action field 264(1) which provides the routing action associated with routing policy <001>. In this case, the routing action includes a destination address corresponding to Service B-production 230(2). The action field 264(1) provides "dsturi":"b-prod.com".

For rule 260(2), a filter 262(2) is applied to routing policy <002>. In this case, the filter 262(2) is listed as "context" meaning that the filter is to be applied based on content of the service request. The filter is looking for a particular test customer within a particular geographic location.

The text customer may be one of the web developers working on the Service B-development 230(3), and is located in the U.S. at the time the service request was made. The service request received by the service router 220 also includes identification of the user of the computing device 202 providing the service request, as well as the geographic location of the user.

Application of the filter 262(2) within rule 260(2) includes determining if the identity of the user of the computing device 202 matches the identity of the test customer, and determining if the geographic location of the user of the computing device 202 is also within the U.S. In this case, the filter 262(2) includes "customer eq 'cull.' and 'geo eq US'". When the identity and location conditions of the user of the computing device 202 are met by the filter 262(2), then the service request having service request address /b/** is considered to be a match to routing policy <002>.

Rule 260(2) also includes an action field 264(2) which provides the routing action associated with routing policy <002>. In this case, the routing action includes a destination address corresponding to Service B-development 230(3). The action field 264(2) provides "dsturi":"b-devl.com".

Even though routing policies <001> and <002> both match the service request address as received by the service router 220, only one routing policy can be applied. To determine which routing policy is to be applied by the service router 220, each routing policy includes a priority. The priorities for routing policies <001> and <002> are provided in column 254 in the routing policy table 250. Routing policy <001> has a priority value 1, and routing policy <002> has a priority value 100. The service router 220 executes the routing action specified by the matched routing policy having the highest priority, in this case routing policy <002>.

Service requests to Service B-production 230(2) from normal users, e.g., users other than the particular test customer located in the US, will be routed to Service B-production 230(2) since the conditions for rule 260(2) cannot be applied.

Routing policies may also be useful in A/B testing for customers. A/B testing is a way to compare two versions of a single variable typically by testing a subject's response to variable A against variable B, and determining which of the two variables is more effective. For this routing scenario, one of the service instances 230(1) supports variable A, and another one of the service instances 230(n) supports variable B. The applicable routing policies would have routing policy addresses matching the service request addresses for service instances 230(1) and 230(n). The respective routing policies may include a filter within the rule identifying which customers are to have version A and which customers are to have version B of the two service instances 230(1) and 230(n).

Other routing scenarios include smart routing considering loads of the service instances, and resource usage of the service instances. Since all service requests go through the service router 220, the service router 220 is able to keep a service request log of the received service requests. For example, such a service request log may show that one of the service instances 230(1) is receiving a very large number of service requests, while an equivalent functioning service instance 230(n) is receiving a very small number of service requests. The service router 220 may then be configured to redirect some of the service requests from service instance 230(1) to service instance 230(n) so as to balance out loading within the microservice architecture 210. The redirection may be implemented with routing policies that would be implemented when a threshold loading condition or threshold usage condition was met by service instance 230(1).

Figure 5:
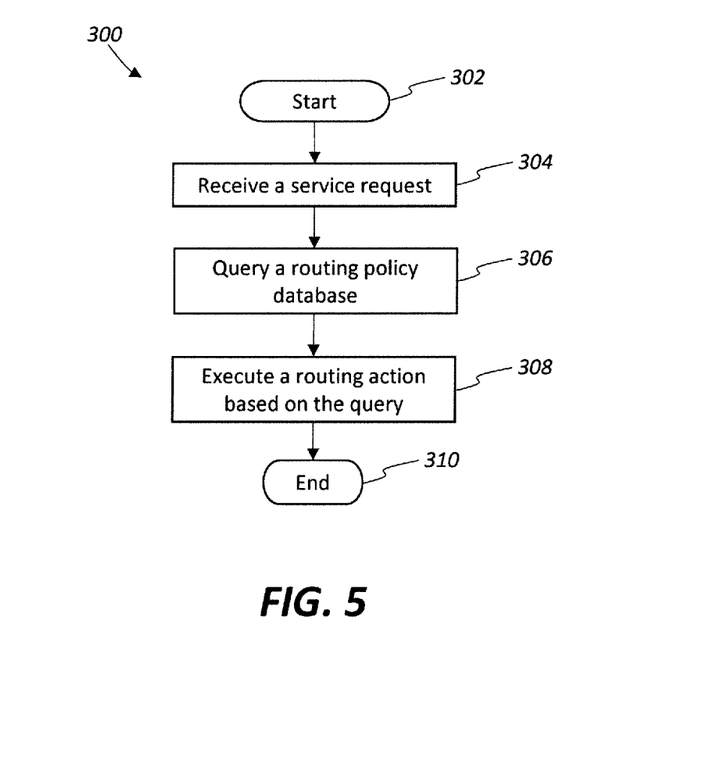
FIG. 5 is a general flowchart illustrating a method for operating the service router illustrated in FIG. 3.

Referring now to the flowchart 300 in FIG. 5, and generally speaking, a method for operating a service provider 220 within a microservice architecture 210 is provided. From the start (Block 302), the service provider 220 receives a service request at Block 304. The service request may include a service request address. The service router 220 queries a routing policy database 222 based on the received service request at Block 306. A routing policy is executed by the service provider 220 at Block 308 based on the query. The method ends at Block 310.

Figure 6:
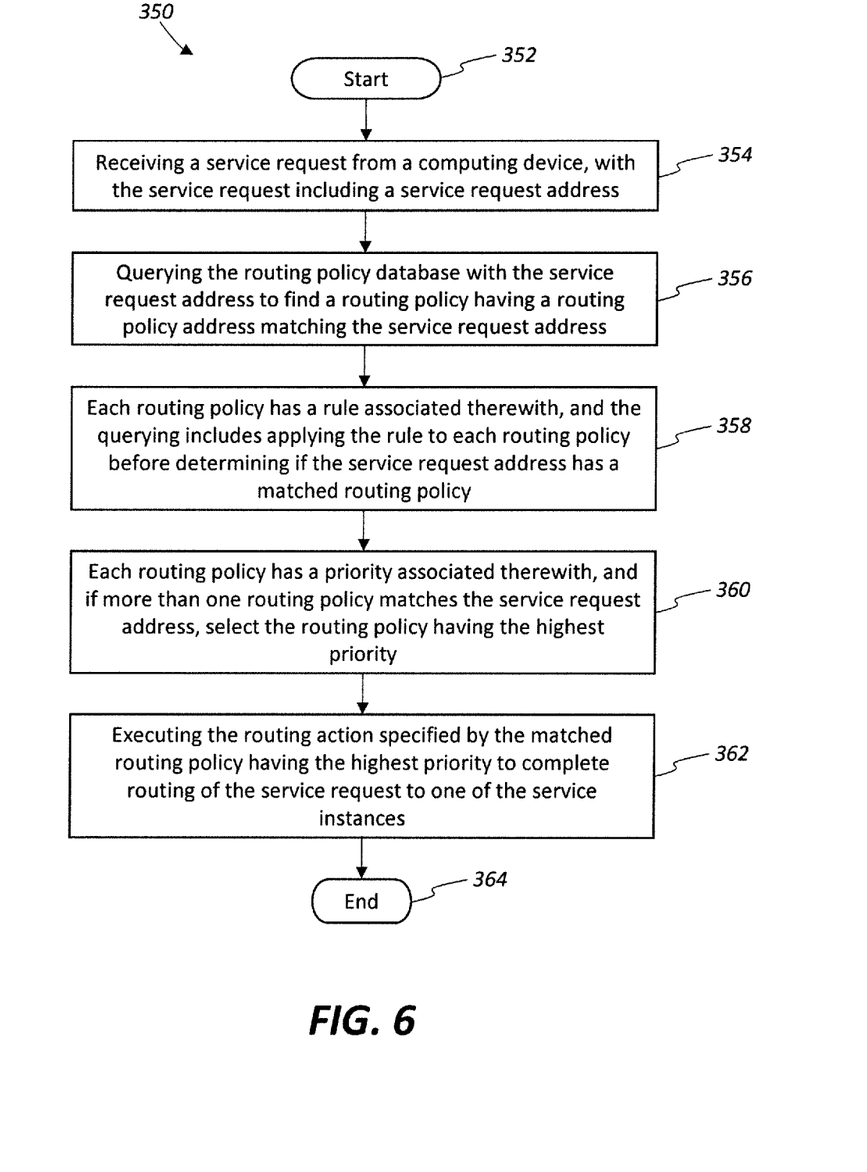
FIG. 6 is a more detailed flowchart illustrating a method for operating the service router illustrated in FIG. 3.

Further details for operating the service provider 220 within the microservice architecture 210 will now be described with reference to the flowchart 350 illustrated in FIG. 6. From the start (Block 352), the method includes receiving a service request from a computing device 202 at Block 354, with the service request including a service request address. The routing policy database 222 is queried with the service request address at Block 356 to find a routing policy having a routing policy address matching the service request address. If each routing policy has a rule associated therewith, then the querying includes applying the rule to each routing policy at Block 358 before determining if the service request address has a matched routing policy. Each routing policy has a priority associated therewith, and if more than one routing policy matches the service request address, then the routing policy having the highest priority is selected at Block 360. The routing action specified by the matched routing policy having the highest priority is executed at Block 362 to complete routing of the service request to one of the service instances 230. The method ends at Block 362.

Yet another aspect is directed to a non-transitory computer readable medium for a central authentication service device 210 used in authenticating a user operating a computing device 220 requesting access to a service provider 230. The non-transitory computer readable medium has a plurality of computer executable instructions for causing the central authentication service device 210 to perform steps comprising receive a service request from a computing device 202, with the service request including a service request address; query the routing policy database 222 with the service request address to find a routing policy having a routing policy address matching the service request address; and execute the routing action specified by the matched routing policy to complete routing of the service request to one of the service instances 230.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A microservice architecture comprising:
  a plurality of service instances collectively configured to cooperate with one another to provide a service; and
  a service router associated with said plurality of service instances and configured to receive a service request from a computing device, with the service request including a service request address, said service router comprising a routing policy database with a plurality of routing policies, with each routing policy including a routing policy address and a rule to determine a particular routing action associated with the routing policy, where the rule includes a filter to define restrictions to narrow a scope of requests to be applied to the routing policy based on at least one of an identity of a user of the computing device and a geographic location of the user, said service router configured to perform the following:
    query the routing policy database with the service request address to find a routing policy having a routing policy address matching the service request address, and
    determine if the restrictions placed by the filter on accessing the particular service instance have been met, and
    execute the routing action specified by the matched routing policy if the restrictions have been met to complete routing of the service request to one of said plurality of service instances.

2. The microservice architecture according to claim 1 wherein said plurality of service instances comprise at least one of a plurality of servers and a plurality of containers.

3. The microservice architecture according to claim 1 wherein the routing action of the matched routing policy includes a destination address corresponding to the service instance receiving the service request.

4. The microservice architecture according to claim 3 wherein the destination address is different from the service request address.

5. The microservice architecture according to claim 1 wherein each routing policy has a priority associated therewith, and if more than one routing policy matches the service request address, then said service router is further configured to execute the routing action specified by the matched routing policy having the highest priority.

6. The microservice architecture according to claim 1 wherein the service request includes identification of the user of the computing device, and the rule identifies at least one individual, and wherein application of the rule includes determining if the identity of the user of the computing device matches the identity of the at least one individual in the rule.

7. The microservice architecture according to claim 1 wherein the service request includes the geographic location of the user of the computing device, and wherein application of the rule includes determining if the geographic location of the user of the computing device is within e a geographic area in the rule.

8. The microservice architecture according to claim 1 wherein the service request corresponds to at least one of an HTTP request, a JSON-RPC request, and an XML-RPC request, with the respective addresses associated therewith corresponding to the URI.

9. The microservice architecture according to claim 1 wherein the service request corresponds to a gPRC request, with the address associated therewith corresponding to the IP port pair.

10. A method comprising:
  operating a service router associated with a plurality of service instances collectively configured to cooperate with one another to provide a service within a microservice architecture, with the service router comprising a routing policy database with a plurality of routing policies, with each routing policy including a routing policy address and a rule to determine a particular routing action associated with the routing policy, where the rule includes a filter to define restrictions to narrow a scope of requests to be applied to the routing policy based on at least one of an identity of a user of a computing device and a geographic location of the user;

receiving, by the service router, a service request from the computing device, with the service request including a service request address;

querying, by the service router, the routing policy database with the service request address to find a routing policy having a routing policy address matching the service request address, and determine if the restrictions placed by the filter on accessing the particular service instance have been met; and executing, by the service router, the routing action specified by the matched routing policy if the restrictions have been met to complete routing of the service request to one of the plurality of service instances.

11. The method according to claim 10 wherein the routing action of the matched routing policy includes a destination address corresponding to the service instance receiving the service request, and the destination address is different from the service request address.

12. The method according to claim 10 wherein each routing policy has a priority associated therewith, and if more than one routing policy matches the service request address, then the method further comprises executing the routing action specified by the matched routing policy having the highest priority.

13. The method according to claim 10 wherein the service request includes identification of the user of the computing device, and the rule identifies at least one individual, and wherein applying the rule includes determining if the identity of the user of the computing device matches the identity of the at least one individual in the rule.

14. A non-transitory computer readable medium for a service router associated with a plurality of service instances collectively configured to cooperate with one another to provide a service within a microservice architecture, with the service router comprising a routing policy database with a plurality of routing policies, with each routing policy including a routing policy address and a rule to determine a particular routing action associated with the routing policy, and with the non-transitory computer readable medium having a plurality of computer executable instructions for causing the service router to perform steps comprising:

receive a service request from a computing device, with the service request including a service request address;

query the routing policy database with the service request address to find a routing policy having a routing policy address matching the service request address, with each routing policy having a priority associated therewith, and execute the routing action specified by the matched routing policy having the highest priority if more than one routing policy matches the service request address to complete routing of the service request to one of the plurality of service instances.

15. The non-transitory computer readable medium according to claim 14 wherein the routing action of the matched routing policy includes a destination address corresponding to the service instance receiving the service request, and the destination address is different from the service request address.

16. The non-transitory computer readable medium according to claim 14 wherein the service request includes identification of a user of the computing device, and the rule identifies at least one individual, and wherein applying the rule includes determining if the identity of the user of the computing device matches the identity of the at least one individual in the rule.

17. A method for operating a service router associated with a plurality of service instances collectively configured to cooperate with one another to provide a service within a microservice architecture, with the service router comprising a routing policy database with a plurality of routing policies, with each routing policy including a routing policy address and a rule to determine a particular routing action associated with the routing policy, the method comprising:

receiving a service request from a computing device, with the service request including a service request address;

querying the routing policy database with the service request address to find a routing policy having a routing policy address matching the service request address, with each routing policy having a priority associated therewith; and executing the routing action specified by the matched routing policy having the highest priority if more than one routing policy matches the service request address to complete routing of the service request to one of the plurality of service instances.

18. The method according to claim 17 wherein the routing action of the matched routing policy includes a destination address corresponding to the service instance receiving the service request, and the destination address is different from the service request address.

19. The method according to claim 17 wherein the service request includes identification of a user of the computing device, and the rule identifies at least one individual, and wherein applying the rule includes determining if the identity of the user of the computing device matches the identity of the at least one individual in the rule.

* * * * *